BEST AVAILABLE COPY

July 12, 1927.

I. C. BELL

MECHANICALLY PACKED PACKER

Original Filed Aug. 12, 1924

Re. 16,670

3 Sheets-Sheet 1

Inventor

I. C. Bell

By Jesse R. Stone

Attorney

July 12, 1927. I. C. BELL Re. 16,670

MECHANICALLY PACKED PACKER

Original Filed Aug. 12, 1924 3 Sheets-Sheet 2

I. C. Bell Inventor

By Jesse R. Stone

Attorney

July 12, 1927. I. C. BELL Re. 16,670

MECHANICALLY PACKED PACKER

Original Filed Aug. 12, 1924 3 Sheets-Sheet 3

I. C. Bell Inventor

By Jesse R. Stone Attorney

Reissued July 12, 1927. Re. 16,670

UNITED STATES PATENT OFFICE.

IVAN C. BELL, OF DALLAS, TEXAS, ASSIGNOR TO THE GUIBERSON CORPORATION, OF DALLAS, TEXAS, A CORPORATION OF DELAWARE.

MECHANICALLY-PACKED PACKER.

Original No. 1,526,411, dated February 17, 1925, Serial No. 731,541, filed August 12, 1924. Application for reissue filed February 8, 1927. Serial No. 166,796.

My invention relates to an improvement in packers to be employed in deep wells. It is particularly adapted for use in oil wells, either as a flow packer or as a bottom plug packer, or for other similar uses.

An object of the invention is to provide a packer of the character indicated which may be placed upon a pipe or tubing and to be so formed as to be expanded at any desired elevation in the well, and to be thereafter released and changed as to position in the well.

Another object is to provide a packer which will be simple in construction, and capable of positive expansion by simply placing the weight of the pipe upon the packer.

Another object is to provide a packing means upon a device of the character stated capable of employing any desirable character of packing arranged in strips to be set in a spiral arrangement to close off the space about the tubing.

Another object is to provide a packer which will remain in contracted position while it is being introduced into the well, and will have provision to prevent its rotation while it is being moved downwardly to the position where it is to be expanded. These and other objects and advantages of the invention will more clearly appear from the specification which follows, and the points of the novelty therein will be set forth in the claims appended hereto.

Referring to the drawing herewith.

Figure 1:
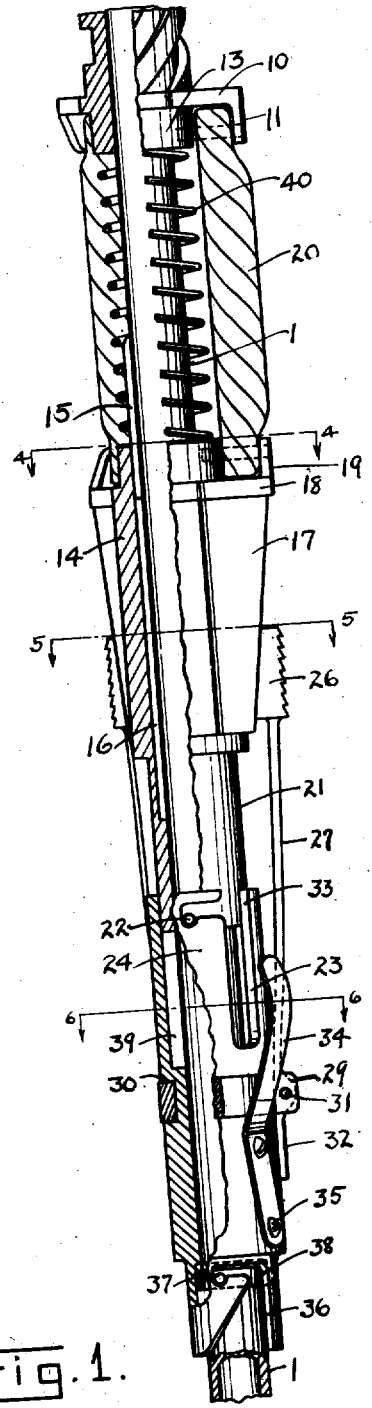
Fig. 1 is a side view partly in elevation, and partly in vertical section showing a packer embodying my invention.
Figure 4:
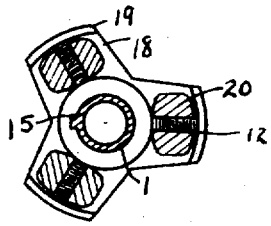
Figure 5:
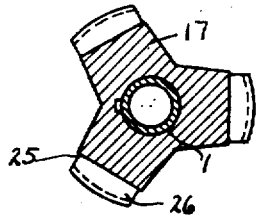
Figure 6:
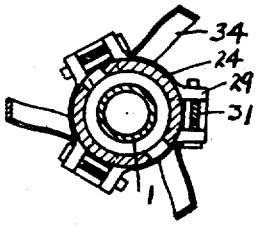

Figs. 4, 5 and 6 are transverse sections on the planes 4—4, 5—5 and 6—6, respectively, of Fig. 1.

Figure 7:
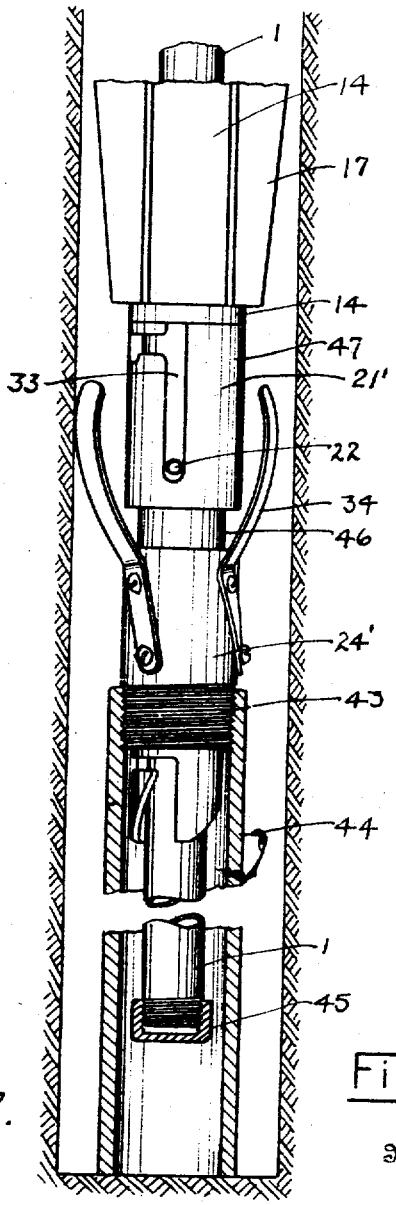
Figure 8:
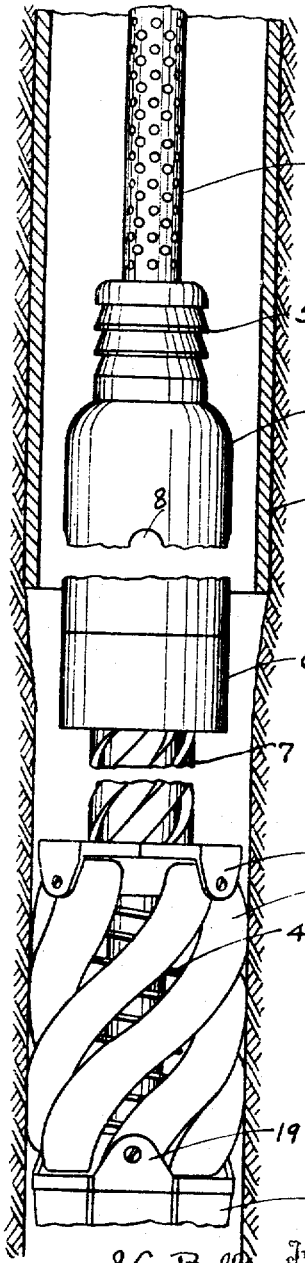

Fig. 7 is a side elevation of the lower portion of a packer modified slightly to adapt it for use as a bottom plug packer, and Fig. 8 is a similar elevation of the upper portion of the modified form shown in Fig. 7.

Like numerals of reference are applied to like parts in all the views.

Figure 2:
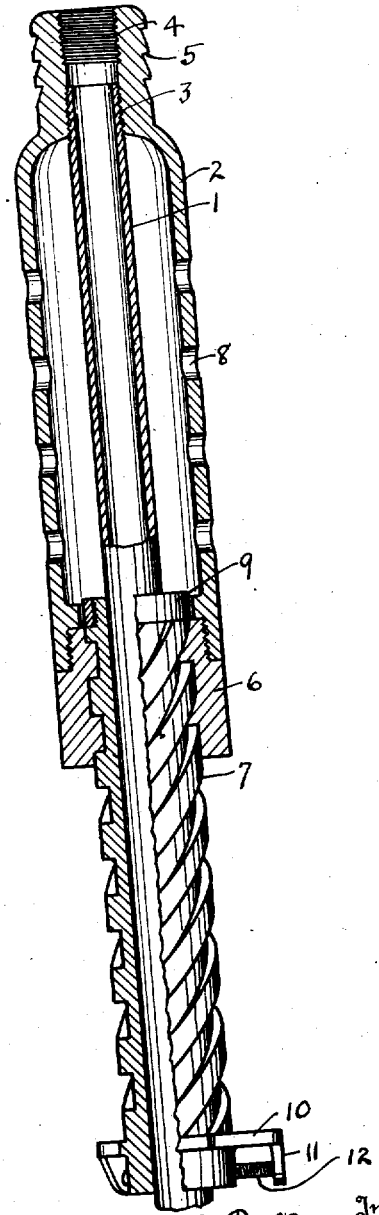
Fig. 2 is a similar view of the upper portion of the packer disclosed in Fig. 1.
Figure 3:
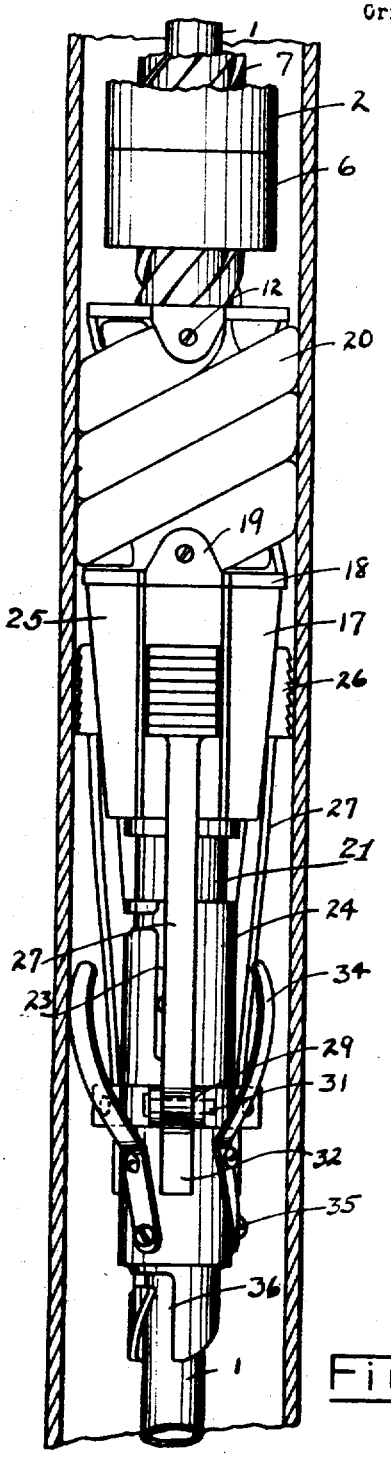
Fig. 3 is a side elevation of the lower operating portion of the packer showing the same in expanded position.

In the drawings I have shown my invention as adapted to be secured upon the lower end of a string of tubing, extending from the surface down to and beyond the packer. For this purpose I have shown a central pipe 1 taking the place of the ordinary tubing or working barrel employed in pumping operations. This pipe is secured at its upper end to the sleeve 2, as shown in Fig. 2. It is there secured within a threaded passage 3, the upper end of which is threaded at 4 for attachment to the main string of tubing. The upper shank or neck of the sleeve 2 is serrated, as shown at 5 to better adapt it to be engaged by a fishing tool, if occasion arises. The sleeve 2 is an operating screw sleeve, the lower end of which is formed into a nut 6 releasably secured to the main sleeve 2, and formed on its inner periphery with a coarse thread to engage with the screw member 7. The sleeve 2 is perforated at various points, as shown at 8, to allow the passage of fluid therethrough.

The screw member 7, which is adapted to rotate the packing element connected with my device, is a tubular sleeve fitting rotatably upon the barrel or pipe 1, and threaded at its outer surface by a coarse, flat crested thread cooperating with the screw or nut 6, upon the sleeve 2. At the upper end of the screw sleeve 7 is a threaded ring 9 to close the upper ends of the thread in the screw element to limit its downward movement. At the lower end of the screw sleeve 7 are formed a plurality of radially extending plates 10. I have shown three of these plates, each adapted to engage with a packing strip which may be attached thereto. On the outer end of each of these plates is a downwardly directed flange 11 which has an opening therein to receive a screw 12 forming an attachment for the said packing strip. The lower end 13 of the screw member is also perforated to receive the inner end of said screw 12.

Spaced below the screw member 7 upon the pipe 1 is a slidable mandrel 14. Said mandrel is tubular and fits slidably upon the inner pipe 1. It is held against rotation thereon by means of a key 15 formed upon the said pipe 1, and within a keyway 16 in the said mandrel. Said keyway extends from the upper end of the mandrel downwardly to a point spaced from the lower end a considerable distance so as to limit the relative movement of the mandrel upon the pipe, when said packing is expanded.

On the outer face of the mandrel are formed a plurality of downwardly inclined slideways 17. I have shown three of these slideways, as indicated in Figs. 4 and 5, each slideway projecting radially from the body of the mandrel. At the upper end of each of the slideways is a shoulder 18, above which is a vertical flange 19 furnishing a support for an attaching pin or screw for the lower end of each of the strips of packing material 20. Below the slideways 17, the mandrel is reduced in diameter and is cylindrical, as shown at 21. The said cylindrical portion is formed on opposite sides with short radial pins 22 to engage within slots 23 in a lower locking sleeve 24.

Each of the slideways 17 has an outer plane face 25 upon which dogs or jaws 26 are slidable. Said jaws are toothed on their outer faces, the teeth being inclined downwardly to engage the casing when the device is moved downwardly. Each jaw is supported and held resiliently in position upon the tapered slideway by means of spring arms 27, secured at their lower ends upon the locking sleeve 24. The attachment is accomplished by securing the spring arms 27 between the adjacent ends of the sector-shaped plates 29 fitting within a groove 30 in the sleeve 24. The adjacent ends of said plates 29 are turned radially outward, and a pin 31 serves to secure the adjacent plates 29 together, and also serves as a pivot for the spring arms 27. Each of said arms is extended beyond the pin 31 to provide a support 32 against the side of the sleeve to hold the upper end of the arm inwardly.

The sleeve 24 is adapted to latch releasably in an inoperative position by means of a bayonet slot 33 adjacent the upper end thereof, said slot being adapted to receive the pin 22 upon the lower end of the mandrel. The dog operating sleeve 24 is prevented from rotating relative to the casing by means of a plurality of leaf springs 34 which are secured on said sleeve adjacent the lower end thereof by attaching screws 35. These springs are secured to the sleeve at a slight angle from the vertical so as to give the sleeve a tendency to rotate in a left-hand direction as viewed from above, and thus hold the sleeve to the left so as to prevent the pin 22 from working out of the lateral branch of the bayonet slot 33. The upper ends of said springs bear resiliently outward a sufficient distance to press against the casing and prevent ordinary rotation of the sleeve 24.

Below the said springs 34 the operating sleeve 24 has a second bayonet slot 36 therein, said slot having a wide lower end tapered upwardly toward the lateral branch thereon, said slot is adapted to receive a pin 37 formed upon a ring 38 shrunk upon the tubing and secured rigidly thereto. In this manner the dog operating sleeve 24 is secured adjustably upon the tubing at its lower end, and is attached adjustably to the mandrel 14 at its upper end. The lower operating sleeve is adapted to telescope over the lower end of the mandrel 21, and is recessed at 39 to receive the mandrel.

The packing strips 20 may be of any flexible packing material, and may even be strips of hemp or rope of any kind, or canvas, as well as ordinary strips of composition packing. The said strips are secured at the upper ends to the plates 10, and at their lower ends to the plates 19, as previously described. The said strips are held under slight tension by means of a compression spring 40, which bears at its upper end against the part 13 of the screw sleeve, and at its lower end against the upper neck of the mandrel. The spring thus tends to hold the mandrel and the screw sleeve resiliently apart.

In the ordinary operation of this device, it is assembled with the parts in the relative positions above described, the dogs, or jaws 26 in inoperative position at the lower ends of the slideways by moving the locking sleeve 24 downwardly and engaging the pins 22 and 37 within the lateral branches of the bayonet slots 23 and 36, respectively. The device is then secured to the lower end of the tubing, and inserted downwardly to the desired point of the well. It may be placed at the lower end of the tubing, or at any desired point intermediate the ends of the tubing.

When the desired point has been reached the dogs will be unlocked from their inoperative position by rotating a partial turn in a lefthand direction so as to move the pins 22 and 36 into the vertical portion of the slots in which they are mounted. The springs 34 will hold the sleeve 24 against rotation while this operation is being performed. The weight of the tubing is then allowed to rest upon the device, and the mandrel 14 will move downwardly relative to the dogs forcing them out to engage the inner face of the casing, thus supporting the mandrel against any movement downwardly in the well; the movement downwardly of the tubing thereafter will force the operating sleeve 22 downwardly along the screw member 7, thus causing the screw member to rotate and at the same time moving the said screw member downwardly relative to the mandrel. This will twist the packing members 20 tightly together, and force them outwardly against the casing, or the walls of the well, thus effectively closing the space between the tubing and the casing.

WELLS
Draftsma

If it is desired to raise the packer to a higher position in the well thereafter, this may be done by simply pulling upwardly upon the tubing, thus untwisting the packing, and moving the mandrels 14 upwardly so as to release the dogs and allow the movement upwardly of the packer. If it is desired to set the packer at a lower point, the device will be moved upwardly sufficiently to raise the pins 22 and 37 to the upper ends of the slots, and the device will then be rotated a partial turn to lock the sleeve 24, thus allowing the device to be moved downwardly to the new position.

This use of the packer is intended to shut off the passage of fluid, either liquid or gas, between the tubing and the casing above or below the packer. It may be employed as the flow packer to confine the gas so that it will pass upwardly through the tubing, or it may be used to cut off the water from above, away from the oil sand. If it is desired to use the packer as a bottom plug to close off water from below the producing sand, the device may be modified as shown in Figs. 7 and 8.

In thus employing the packer, it will be placed on the lower end of the tubing and said tubing above the sleeve 2 will be perforated, as shown, at 41, to allow the inlet of fluid to the tubing above the packer. In such a case, the casing 42 may not extend to the lower end of the hole, and in Figs. 7 and 8 I have indicated the lower portion of the hole as being open without a casing. The packing portion of the device is the same as previously described, except that the supporting dogs and sleeves 24 which operate the same, are omitted. The springs 34 are mounted on a supporting sleeve 24′, which is threaded at its lower end 43 to engage with a supporting pipe 44. The lower end of the tubing is closed by means of a cap 45 below the sleeve 24′. Said sleeve has its upper end 46 telescoping within a collar 47 extending downwardly from the mandrel 14. A pin 22 upon the sleeve 46 is slidable within the slot 33 in the member 47.

In the operation of this device the parts are assembled, as shown in the drawing, and then lowered in the well until the pipe 44 rests upon the bottom of the hole. During this operation, the packing will be held in contracted position by springs 40, as previously described, and the arrangement of the springs 34 will keep the pin 22 within the lateral branch of the slot 33. When the bottom has been reached, the device will be rotated a partial turn to bring the pin 22 within the vertical portion of the slot 33, and the mandrel will be lowered downwardly against the supporting member, bringing the pin 22 to the lower end of the slot, as shown in Fig. 7. This will serve to prevent further downward movement of the mandrel so that the continued downward movement of the tubing will rotate the packing members so as to close the space between the tubing and the walls of the well. This operation is shown as being partially performed in Fig. 8, it being understood that when the packing is rotated somewhat further and forced together by the sleeve 7, the packing will effectively close the space above the mandrel.

It will be obvious that the mandrel 14 will not be necessary in this construction, except as a supporting member for the lower end of the packing elements. It serves in ordinary purposes as an expanding member for supporting jaws, and is shown in the form indicated as simply a modified form of a previous construction. The openings 8 in the sleeve 2 allow the passage of fluid so as to prevent any tendency for a pumping action when the said sleeve 2 is forced downwardly over the screw member 7.

The advantages of this type of construction lie in the fact that the packing is positively and accurately expanded to close the space about the tubing at the point desired, and that any type of strip packing of ordinary construction may be employed as desired. A packer of this kind may be used repeatedly and whenever desired in wells in which the gas pressure is present, or for purposes of closing off the entrance of water to the producing stratum. It is simple and accurate in its operation, and will have many advantages which will be obvious to those skilled in the art without further description.

While I have shown the preferred embodiment of my invention, I do not wish to be confined to this particular construction, it being obvious that many changes may be made coming within the scope of my invention.

What I claim as new, and desire to protect by Letters Patent is:

1. A packer for wells comprising a central tube, a mandrel slidable thereon, means to anchor said mandrel to the walls of the well, a rotatable screw sleeve spaced above said mandrel, longitudinal strips of flexible packing material connected between said mandrel and said screw sleeve, and means to rotate said screw sleeve and twist and expand said packing.

2. A packer for wells comprising a central tube, a mandrel keyed slidably thereon, means to anchor said mandrel to the walls of the well, a rotatable screw sleeve above said mandrel, a plurality of packing strips connecting said mandrel and sleeve, and means to rotate and depress said sleeve and packing.

3. A packer for wells comprising a central tube, a mandrel keyed slidably thereon, means to anchor said mandrel to the walls of the well, a rotatable screw sleeve above said mandrel, a spring on said tube spacing said sleeve from said mandrel, a plurality of packing strips connecting said mandrel and sleeve, and means to rotate and depress said sleeve and packing, comprising an operating sleeve having threaded engagement with said screw sleeve.

4. A packer for wells comprising a tube, a mandrel slidable on said tube, means to anchor said mandrel to the walls of the well and support said tube, a series of flexible packing strips secured to said mandrel in normally vertical position and means to twist and depress said packing strips.

5. In a packer for wells, a tube, an operating sleeve thereon, a screw sleeve engaging within said operating sleeve, said screw sleeve being rotatable on said tube, a mandrel spaced resiliently below said screw sleeve, longitudinal strips of flexible packing connected between said screw sleeve and said mandrel, means to secure said mandrel nonrotatably to the walls of the well, and means to depress said operating sleeve, rotate said screw sleeve and twist and expand said packing.

6. In a packer for wells, a cylindrical member, an operating sleeve thereon, a rotatable screw sleeve engaging within said operating sleeve, a mandrel nonrotatable on said tube below said screw sleeve, strips of flexible packing secured to said mandrel and said screw sleeve, and means to anchor said mandrel to the walls of the well, whereby said tube and operating sleeve may be depressed to twist and expand said packing for the purpose described.

7. In a packer for wells, a cylindrical member, a mandrel slidable mountably thereon, packing strips secured to the upper end thereof, and means slidable rotatably on said cylindrical member to twist and depress said packing strips.

8. In a packer for wells, a tubular member, packing strips longitudinally thereof, means to support said strips and means to twist said packing strips on said tube and depress and expand the same.

9. In a packer for wells, a tube, packing strips longitudinally of said tube, nonrotatable means to which said strips are connected at one end, means rotatable on said tube connected to said strips at the other end, and means to rotate said last mentioned means.

10. In a packer for wells, a tube, a nonrotatable supporting member slidable on said tube, a rotatable member spaced resiliently above said supporting member, strips of flexible packing connected between said members, and means operated by depressing said tube to twist and expand said packing.

11. In a packer for wells, a tube, a mandrel keyed slidably thereon, downwardly tapered slideways on said mandrel, a locking sleeve below said mandrel, jaws slidable on said slideways, resilient means on said locking sleeve to hold said jaws on said slideways, means to resist rotation of said locking sleeve, and a packer above said mandrel adapted to be expanded when said tube is depressed relative to said mandrel.

12. In a packer for wells, a tube, a mandrel keyed slidably thereon, downwardly tapered slideways on said mandrel, a locking sleeve below said mandrel, jaws slidable on said slideways, resilient means on said locking sleeve to hold said jaws on said slideways, means to resist rotation of said locking sleeve, and a packer above said mandrel adapted to be expanded when said tube is depressed relative to said mandrel, and means to limit the downward movement of said tube.

13. In a packer for wells, a tube, a downwardly tapered mandrel slidable thereon, a locking sleeve below said mandrel, jaws resiliently supported on said locking sleeve bearing against said mandrel, means releasable on the rotation of said tube to hold said jaws in position at the lower end of said mandrel, a packer above said mandrel and means to rotate and depress said packer when said tube is depressed relative to said mandrel.

14. In a packer for wells, a tube, a sleeve rotatable thereon, a packing strip secured to said sleeve, means to support the lower end of said packing strip, and means operable as said tube is depressed in said supporting means to rotate said sleeve and twist and expand said packing.

15. In a packer for wells, a tube, a plurality of packing strips supported longitudinally of said tube, means slidable relative to said tube to support one end of said strip, and means operable when said tube is in the well to twist and expand said packing strips.

16. In a packer for wells, a tube, a downwardly tapered mandrel slidable nonrotatably thereon, strips of flexible packing material secured to the upper end of said mandrel, means to which the upper end of said packing is connected to twist and compress said packing, means to anchor said mandrel to the well casing, comprising toothed jaws slidable on said mandrel, and releasable means to hold said dogs in inoperative position.

17. As a sub-combination in a packer for wells, a rotatable sleeve, and spring arms attached to the sleeve and bowed therefrom for engaging the walls of a well, said arms having their bowed portions disposed uprightly and at an angle and tending to rotate the sleeve when the latter is moved downwardly in a well.

18. As a sub-combination in a packer for wells, a packer member having a stationary pin, a sleeve rotatable on the packer member and having a bayonet slot receiving said pin, and bowed springs carried by the sleeve and disposed at an angle to the vertical, said springs being adapted to engage the walls of a well and tending to rotate the sleeve to retain the pin in the slot while the packer member is being moved downwardly in a well.

19. As a sub-combination in a packer for wells, a packer member having a stationary pin, a sleeve having a vertical slot with a lateral offset, the pin being normally positioned in the offset of the slot of the sleeve, and means carried by the sleeve for frictionally engaging the walls of a well for holding the sleeve against rotation when the packer member is rotated and disposed so as to tend to rotate the sleeve in a counter direction while the packer member is being moved downwardly in a well, whereby the pin is retained in the offset portion of the slot.

20. As a sub-combination in a packer for wells, a packer member having a stationary pin, a sleeve having a bayonet slot receiving said pin, and a plurality of spring arms, each having a lower portion secured to the sleeve and an upper portion bowed outwardly from the sleeve with its extreme upper end free and directed inwardly, each arm being disposed at an angle to the vertical.

IVAN C. BELL.